United States Patent [19]
Kumai et al.

[11] Patent Number: 5,742,578
[45] Date of Patent: Apr. 21, 1998

[54] INFORMATION RECORDING AND REPRODUCING APPARATUS USING LIGHT BEAM MODULATION ON A SPIRAL GUIDE GROOVE DISK

[75] Inventors: Yuji Kumai; Kyoko Suzuki, both of Kanagawa, Japan

[73] Assignee: Sony Corporation, Tokyo, Japan

[21] Appl. No.: 560,545

[22] Filed: Nov. 17, 1995

[30]   Foreign Application Priority Data

Nov. 22, 1994   [JP]   Japan ................... 6-287796

[51] Int. Cl.⁶ .................................................. G11B 7/125
[52] U.S. Cl. .................. 369/124; 369/44.26; 369/44.32; 369/44.13; 369/111
[58] Field of Search ................................... 369/124, 111, 369/275.3, 275.1, 44.23, 44.26, 44.32, 58, 59, 44.13

[56]          References Cited

U.S. PATENT DOCUMENTS

| 5,126,994 | 6/1992 | Ogawa et al. ............. | 369/116 |
| 5,247,507 | 9/1993 | Morimoto et al. .......... | 369/111 |

FOREIGN PATENT DOCUMENTS

| A-0 303 373 | 2/1989 | European Pat. Off. . |
| A-0 371 880 | 6/1990 | European Pat. Off. . |
| A-0 623 921 | 11/1994 | European Pat. Off. . |

*Primary Examiner*—David C. Nelms
*Assistant Examiner*—Kim-Kwok Chu
*Attorney, Agent, or Firm*—William S. Frommer; Alvin Sinderbrand

[57]          ABSTRACT

An information recording and reproducing apparatus comprises an optical device for causing a light beam to impinge upon a disc having a spiral guide groove along which a control signal is substantially recorded for scanning the spiral guide groove; a light beam modulating portion operative to intensity-modulate the light beam incident upon the disc in response to an information signal so that the information signal is intermittently recorded on the disc and operative further to cause the light beam to keep a relatively small intensity during a period in which the recording of the information signal is temporarily interrupted; a photo-detecting portion for detecting the light beam coming from the disc; a read signal processing portion operative to obtain, based on a detection output from the photo-detecting portion, a read output signal containing a read output of the control signal and a total amount signal corresponding to momentary total light amount of the light beam received by the photo-detecting portion; a variable gain control portion operative to perform a gain-control to the read output signal in response to the total amount signal when the light beam coming from the disc is detected by the photo-detecting portion; and a signal reproducing portion for obtaining a reproduced output of the control signal on the strength of the read output signal having been subjected to the gain-control performed by the variable gain control portion.

5 Claims, 7 Drawing Sheets

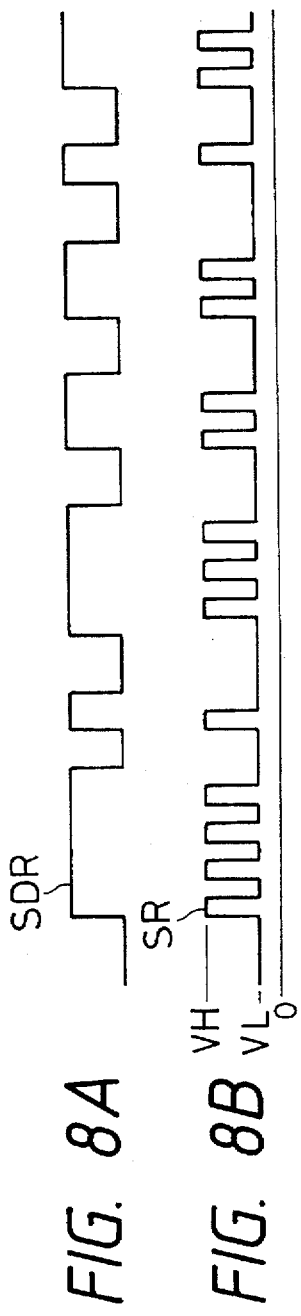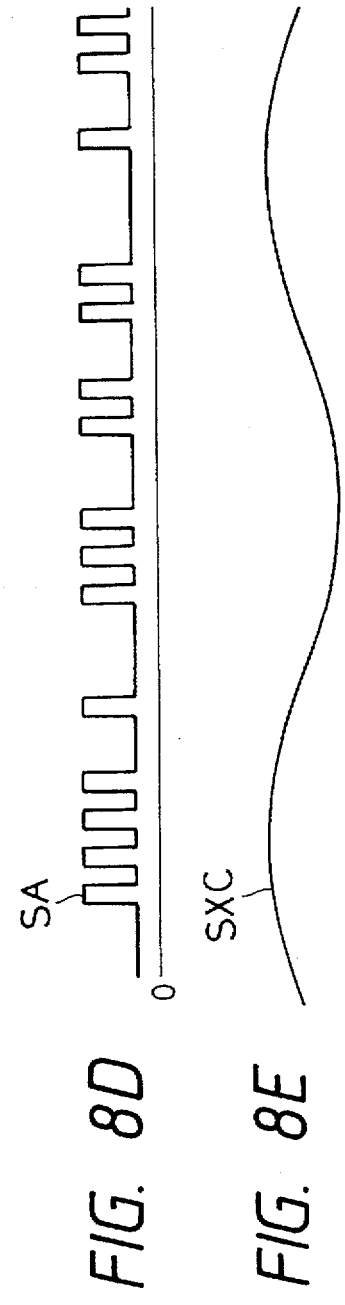

INFORMATION RECORDING AND REPRODUCING APPARATUS USING LIGHT BEAM MODULATION ON A SPIRAL GUIDE GROOVE DISK

BACKGROUND OF THE INVENTION

1. Field of the Invention

This invention relates generally to information recording and reproducing apparatus and is directed to improvements in an apparatus operative to cause a light beam or light beams to impinge upon a disc-shaped medium on which a spiral guide groove is formed to surround a central portion of the medium for recording information thereon or reproducing information therefrom.

2. Description of the Prior Art

There has been proposed to be put to practical use a so-called optical writable disc which is available for optically writing an information signal repeatedly in record tracks provided thereon with use of a light beam. The optical writable disc usually has a center hole and is previously provided with a spiral guide groove formed on a base substance to surround the center hole. The spiral guide groove is utilized for obtaining a tracking error signal which is necessitated in a tracking servo-control portion for controlling the light beam to impinge properly upon a record track on which an information signal is to be recorded or has been recorded or for obtaining information such as address data indicating addresses on the record track, when the optical writable disc is rotated at an imaginary rotation axis passing through the center hole with the light beam incident thereon for recording or reproduction of information. The record track is formed at the bottom of the spiral guide groove or between each two turns of the spiral guide groove.

In the optical writable disc on which the spiral guide groove is provided to surround the center hole for producing the information such as address data in addition to the tracking error signal, the side-walls of the spiral guide groove, which are opposite to each other, are slightly deviated in position in the direction along the width of the spiral guide groove in response to a control signal such as an address data signal which is different from the information signal which is to be recorded on the record track, and therefore the control signal is substantially recorded along the spiral guide groove. That is, each turn of the spiral guide groove is shaped to meander in response to the control signal. The meanderings of the spiral guide groove are formed with the maximum amplitude in the direction along the width of the spiral guide groove corresponding to, for example, 5 to 20 percent of the pitch between each two turns of the spiral guide groove.

When the disc on which the spiral guide groove is provided to meander in response to the control signal such as the address data signal is rotated and a light beam is caused to impinge upon the disc for recording information signal thereon or reproducing information signal therefrom, the meanderings of the spiral guide groove are read by the light beam incident upon the disc. For example, when the information is recorded on the disc, the meanderings of the spiral guide groove provided on the disc are read by a recording light beam and the recording light beam by which the meanderings of the spiral guide groove on the disc are read is detected by a photo-detecting portion. Then, a tracking error signal and a control signal such as an address data signal are obtained on the strength of a detection output signal from the photo-detecting portion. The tracking error signal and the control signal thus obtained are used for controlling an operation for information recording. Further, when the information signal recorded on the disc is reproduced, both the information signal recorded on the disc and the meanderings of the spiral guide groove provided on the disc are read by a reading light beam and the reading light beam by which the meanderings of the spiral guide groove on the disc are read is detected by the photo-detecting portion. Then, the tracking error signal and the control signal are obtained on the strength of a detection output signal from the photo-detecting portion. The tracking error signal and the control signal thus obtained are used for controlling an operation for information reproducing.

In the case where the disc on which the spiral guide groove is provided to meander in response to the control signal such as address data signal is used, there is an advantage that the control signal such as the address data signal can be easily reproduced from every part of a record track area of the disc where a record track is formed in addition to the spiral guide groove, when an information signal is recorded on the disc or an information signal recorded on the disc is reproduced.

When the control signal such as the address data signal is reproduced from the disc on which the spiral guide groove is provided to meander in response to the control signal as mentioned above, the control signal is easily obtained on the strength of the detection output signal from the photo-detecting portion for detecting the reading light beam by which the meanderings of the spiral guide groove on the disc are read, if the reading light beam is kept to have a constant light intensity, but it is feared that the control signal can not be properly obtained on the strength of the detection output signal from the photo-detecting portion for detecting the reading light beam by which the meanderings of the spiral guide groove on the disc are read, if the reading light beam is provided with variations in light intensity.

That is, no particular problem arises in reproduction of the control signal corresponding to the meanderings of the spiral guide groove on the disc, when the light beam for reading meanderings of the spiral guide groove is not provided with any variation in light intensity like a usual reading light beam having a constant light intensity. However, when the light beam for reading the meanderings of the spiral guide groove is provided with variations in light intensity like a recording light beam modulated in light intensity, spurious signal components resulting from the variations in light intensity of the light beam are undesirably mixed in the detection output signal from the photo-detecting portion for detecting the light beam by which the meanderings of the spiral guide groove on the disc are read.

Although it is not so difficult to separate by means of a filter the control signal such as the address data signal from the detection output signal obtained from the photo-detecting portion, in which the spurious signal components resulting from the variations in light intensity of the light beam are mixed, if the spurious signal components reside in a frequency band other than the frequency band of the control signal, the control signal can not be separated by means of a filter from the detection output signal obtained from the photo-detecting portion, in which the spurious signal components resulting from the variations in light intensity of the light beam are mixed, if the spurious signal components reside in a frequency band overlapping the frequency band of the control signal.

When the meanderings of the spiral guide groove are read by the recording light beam modulated in light intensity by the information signal which is to be recorded on the disc, the spurious signal components undesirably mixed in the detection output signal from the photo-detecting portion are produced based on the information signal recorded on the disc and therefore the frequency band of the spurious signal components and the frequency band of the control signal such as the address data signal overlap each other.

OBJECTS AND SUMMARY OF THE INVENTION

Accordingly, it is an object of the present invention to provide an information recording and reproducing apparatus in which a disc-shaped record medium on which a spiral guide groove is formed to meander in response to a control signal such as an address data signal so that the control signal is substantially recorded along the spiral guide groove is provided to be rotated and a light beam is caused to impinge upon the disc-shaped record medium for recording information thereon or reproducing information therefrom, and which avoids the aforementioned problems or disadvantages encountered with the prior art.

Another object of the present invention is to provide an information recording and reproducing apparatus in which a disc-shaped record medium on which a spiral guide groove is formed to meander in response to a control signal such as an address data signal so that the control signal is substantially recorded along the spiral guide groove is provided to be rotated and a light beam is caused to impinge upon the disc-shaped record medium for recording information thereon or reproducing information therefrom, and which can reproduce easily and appropriately with relatively simple construction the control signal such as the address data signal on the strength of a detection output signal from a photo-detecting portion for detecting the light beam by which the meanderings of the spiral guide groove formed on the disc-shaped record medium are read even in the case where the light beam caused to impinge upon the disc-shaped record medium is modulated in light intensity.

A further object of the present invention is to provide an information recording and reproducing apparatus in which a disc-shaped record medium on which a spiral guide groove is formed to meander in response to a control signal such as an address data signal so that the control signal is substantially recorded along the spiral guide groove is provided to be rotated and a light beam is caused to impinge upon the disc-shaped record medium for recording information thereon or reproducing information therefrom, and which is operative to reproduce easily and appropriately with relatively simple construction the control signal such as the address data signal on the strength of a detection output signal from a photo-detecting portion for detecting the light beam by which the meanderings of the spiral guide groove on the disc are read even in the case where the light beam caused to impinge upon the disc-shaped record medium is modulated in light intensity and operative further to apply the reproduced control signal to control operation for recording the information the disc-shaped record medium or control operation for reproducing information from the disc-shaped record medium.

According to the present invention, there is provided an information recording and reproducing apparatus comprising an optical device for causing a light beam to impinge upon a disc-shaped record medium, on which a spiral guide groove surrounding a central portion of the disc-shaped record medium is formed to have side-wall portions opposite to each other and meandering in response to a predetermined control signal so that the predetermined control signal is substantially recorded along the spiral guide groove, for scanning the spiral guide groove continuously; a light beam modulating portion operative to intensity-modulate the light beam impinging upon the disc-shaped record medium for scanning the spiral guide groove in response to an information signal so that the information signal is intermittently recorded on the disc-shaped record medium and operative further to cause the light beam to keep a relatively small intensity during a period in which the recording of the information signal is temporarily interrupted; a photo-detecting portion for detecting the light beam coming from the disc-shaped record medium on which the spiral guide groove is scanned by the light beam; a read signal processing portion operative to obtain a read output signal containing a read output of the predetermined control signal recorded along the spiral guide groove and a total amount signal corresponding to momentary total light amount of the light beam coming from the disc-shaped record medium to be received by the photo-detecting portion on the strength of a detection output signal obtained from the photo-detecting portion; a variable gain control portion operative to perform a gain-control to the read output signal obtained from the read signal processing portion in response to the total amount signal obtained from the read signal processing portion when the light beam coming from the disc-shaped record medium is detected by the photo-detecting portion; and a signal reproducing portion for obtaining a reproduced output of the predetermined control signal recorded along the spiral guide groove on the strength of the read output signal having been subjected to gain-control performed by the variable gain control portion.

In the information recording and reproducing apparatus thus constituted in accordance with the present invention, when the recording light beam having been intensity-modulated in response to the information signal by the light beam modulating portion is caused to impinge upon the disc-shaped record medium so that the information signal is intermittently recorded on the disc-shaped record medium, the predetermined control signal recorded along the spiral guide groove in the form of the meanderings of the side-walls of the spiral guide groove is read by the recording light beam, and the read output signal containing the read output of the predetermined control signal and the total amount signal corresponding to momentary total light amount of the light beam coming from the disc-shaped record medium are obtained from the read signal processing portion on the strength of the detection output signal obtained from the photo-detecting portion.

Then, in the variable gain control portion, the read output signal is gain-controlled in response to the total amount signal and therefore spurious signal components resulting from the variations in light intensity of the recording light beam and mixed in the read output signal are substantially suppressed and the read output signal having been subjected to the gain-control by the variable gain control portion contains substantially only the read output of the predetermined control signal recorded along the spiral guide groove. Consequently, in the signal reproducing portion which is operative to obtain the reproduced output of the predetermined control signal on the strength of the read output signal having been gain-controlled by the variable gain control portion, the predetermined control signal on the strength reproduced even under the condition in which the predetermined control signal recorded along the spiral guide groove in the form of the meanderings of the side-walls of the spiral guide groove is read by the recording light beam which is intensity-modulated in response to the information signal to be provided with the variations in light intensity.

Accordingly, with the information recording and reproducing apparatus according to the present invention, the predetermined control signal recorded along the spiral guide groove on the disc-shaped record medium can be appropriately reproduced with relatively simple construction even in the case where the light beam intensity-modulated in response to the information signal supplied to be recorded is caused to impinge upon the disc-shaped record medium for recording the information signal thereon and the reproduced control signal can be applied to control operation for information recording.

The above and other objects, features and advantages of the present invention will become apparent from the following detailed description which is to be read in conjunction with the accompanying drawings.

BRIEF DESCRIPTION OF THE DRAWINGS

FIGS. 8A–8E show schematic waveforms used for explaining the operation of the essential part of the information recording and reproducing apparatus shown in FIG. 1;

DESCRIPTION OF THE PREFERRED EMBODIMENT

Figure 1:
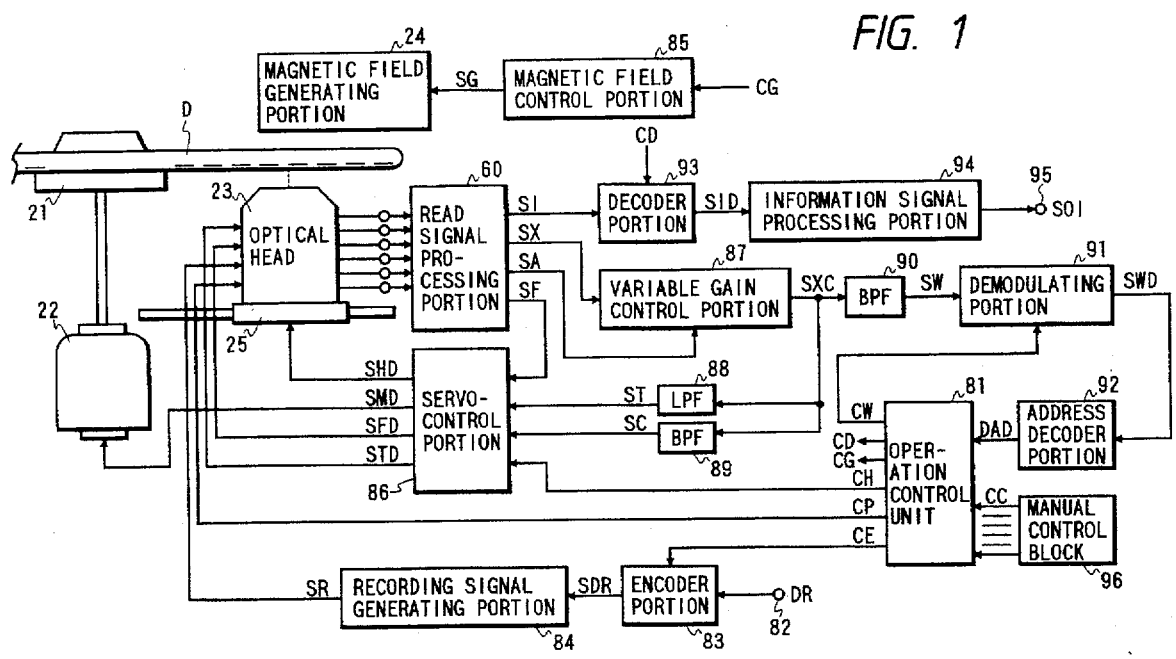
FIG. 1 is a schematic block diagram showing an essential part of one embodiment of information recording and reproducing apparatus according to the present invention.

FIG. 1 shows schematically one embodiment of information recording and reproducing apparatus according to the present invention. In this embodiment, an optical writable disc D is supported by a disc driving table 21 which is able to rotate at a predetermined speed.

Figure 2:
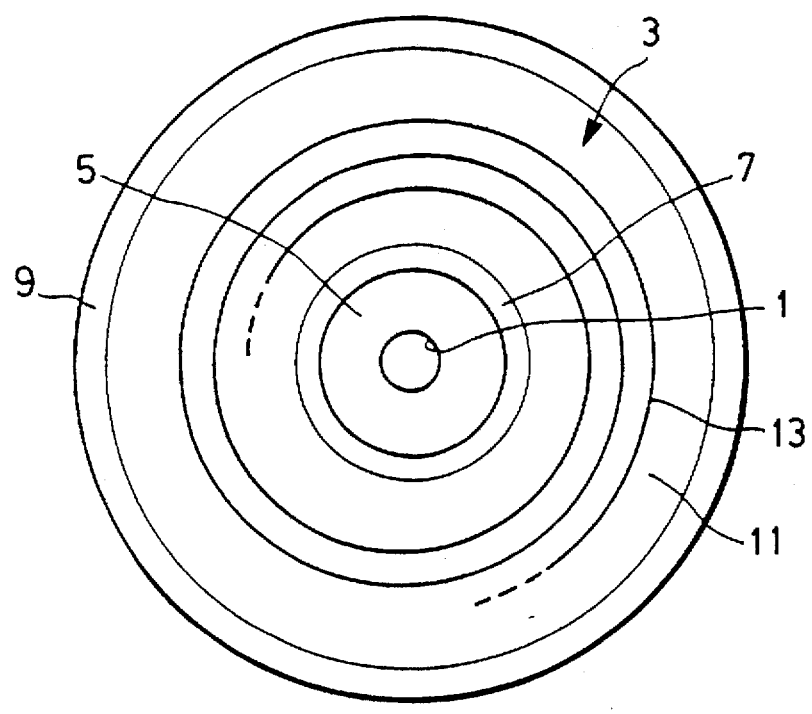
FIG. 2 is a schematic illustration showing one example of disc provided in one embodiment of information recording and reproducing apparatus according to the present invention.

As shown in FIG. 2, the disc D is provided with a center hole 1, an information recording area 3 around the center hole 1 and a label area 5 between the center hole 1 and the information recording area 3. On the information recording area 3, an innermost ring area 7 is provided to surround the label area 5, an outermost ring area 9 is provided at the outer fringe portion of the disc D, and a record track area 11 on which a light beam impinges to form a record track for recording an information signal thereon or to scan the record track for reading an information signal recorded thereon is formed is provided between the innermost ring area 7 and the outermost ring area 9.

On the record track area 11, a spiral guide groove 13 which has a plurality of turns with a pitch (a distance between centers of two adjacent turns) of constant is previously provided to surround the innermost ring area 7. The spiral guide groove 13 is formed with a constant depth and a constant width and provided along the bottom portion thereof with a spiral record track so that the spiral guide groove 13 is scanned by the light beam impinging upon the disc D when the information signal is recorded on the spiral record track or the information signal recorded on the spiral record track is read from the record track.

Figure 3:
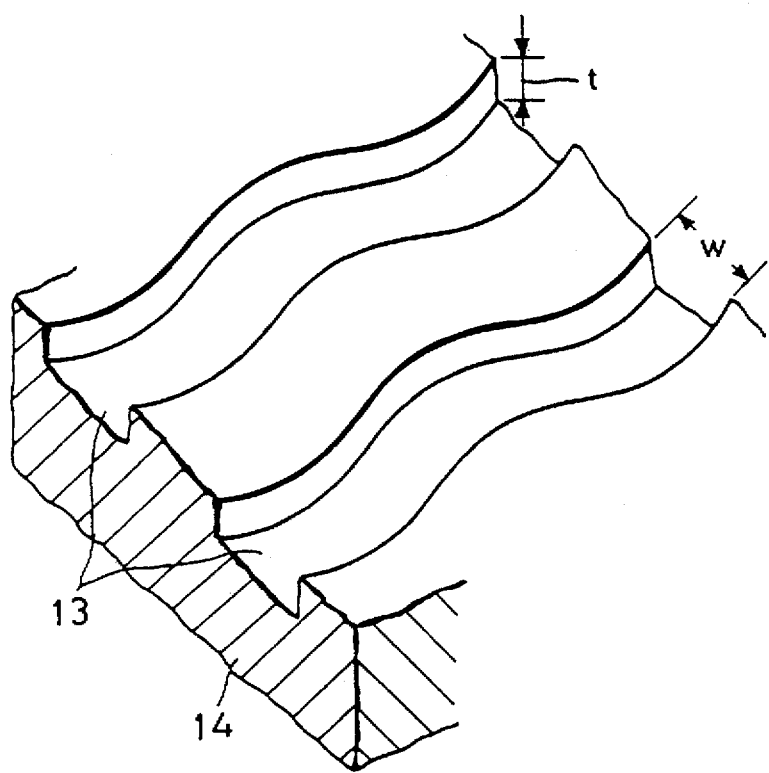
FIG. 3 is a schematic partial perspective view used for explaining a spiral guide groove formed on the disc shown in FIG. 2.
Figure 4:
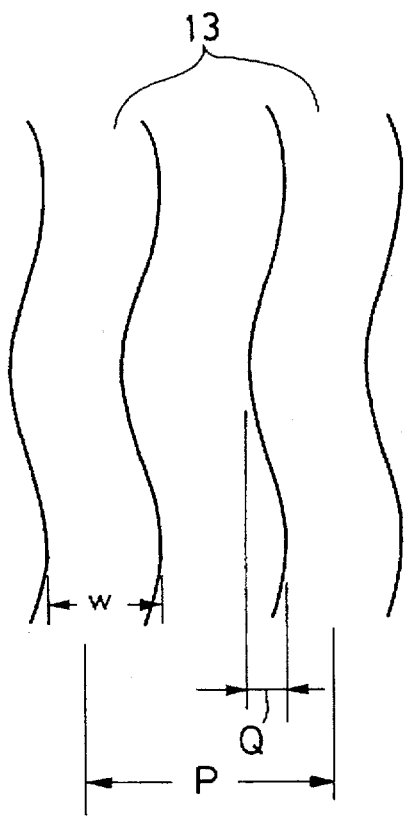
FIG. 4 is a schematic partial plane view used for explaining the spiral guide groove shown in FIG. 3.

As shown in FIG. 3, the spiral guide groove 13 is formed at the surface portion of a base substance 14 of the disc D to have side-walls opposite to each other and to meander with a slight amplitude. In FIGS. 3 and 4, the pitch, depth, width and maximum amplitude in meandering of the spiral guide groove 13 are shown respectively with P, t, w and Q. The pitch P is larger than the width w and the maximum amplitude Q in meanderings of the spiral guide groove 13 is limited to 5 to 20 percent of the pitch P. Consequently, the information signal recorded on the spiral record track or the information signal read from the spiral record track is prevented from receiving undesirable influence from the meanderings of the spiral guide groove 13. The depth t of the spiral guide groove 13 is selected, for examples to correspond to ⅛ of the wavelength of the light beam impinging upon the disc D.

The meanderings of the spiral guide groove 13 with the maximum amplitude Q are made, for example, in response to an address data signal representing addresses on the record track area 11 of the disc D, which is a kind of control signals, and therefore the address data signal is substantially recorded along the spiral guide groove 13. The address data signal thus recorded substantially along the spiral guide groove 13 is produced, for example, by frequency-modulating a carrier wave signal having a predetermined frequency with address data coded in accordance with a predetermined coding system. The frequency of the carrier wave signal is selected to be a constant frequency residing in a frequency band higher than the servo-control frequency band of a tracking servo-control system which is constituted when the spiral guide groove 13 is scanned by the light beam during the recording of information signal or the reading of information signal.

Figure 5:
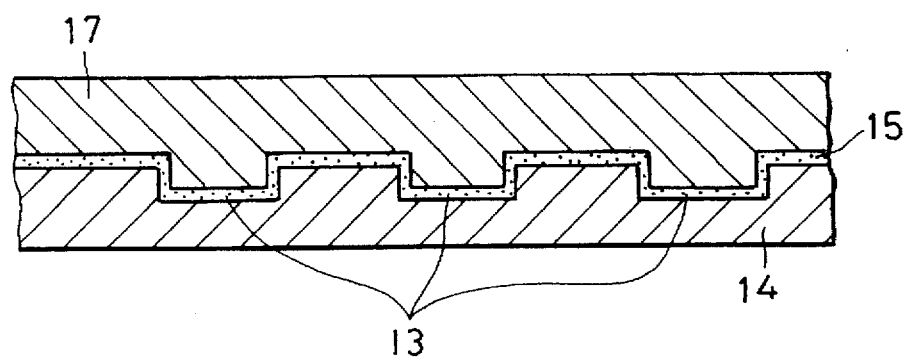
FIG. 5 is a schematic partial cross-sectional view of the disc shown in FIG. 3.

The disc D having the base substance 14 on which the spiral guide groove 13 is formed as shown in FIG. 4 is provided with a thin magnetic recording material layer 15 covering the surface portion of the base substance 14 and a protection layer 17 put on the magnetic recording material layer 15, as shown in FIG. 5. The magnetic recording material layer 15 is put on both the spiral guide groove 13 and a portion of the base substance 14 between each two adjacent turns of the spiral guide groove 13 to contribute actually to the recording of information signal. Accordingly, the magnetic recording material layer 15 also forms a spiral groove along the spiral guide groove 13 and the information signal is recorded on the bottom portion of the spiral groove formed by the magnetic recording material layer 15.

The protection layer 17 is provided to fill up the spiral groove formed by the magnetic recording material layer 15 and to have a flat outer surface. The magnetic recording material layer 15 is selected to be, for example, a perpendicular magnetized layer with which a magnetooptic recording is performed. In the magnetooptic recording performed with the perpendicular magnetized layer, when a light beam such as a laser beam is incident upon the perpendicular magnetized layer under a condition in which a predetermined magnetic field affects the perpendicular magnetized layer, a portion of the perpendicular magnetized layer upon which the light beam impinges with light intensity more than a predetermined value raises an inversion in magnetization in response to a rise in temperature thereat.

In the disc D thus constituted, a recording light beam for recording the information signal or a reading light beam for reading the information signal is incident through the base substance 14 upon the magnetic recording material layer 15 from the outside of the disc D so as to scan the spiral guide groove 13. The recording light beam or reading light beam having scanned the spiral guide groove 13 is reflected by the magnetic recording material layer 15 at the bottom of the spiral guide groove 13 to return through the base substance 14 toward the outside of the disc D.

The disc D supported by the disc driving table 21 is rotated together with the disc driving table 21 which is driven to rotate at the predetermined speed by a disc driving motor 22. An optical head 23 is provided to face the disc D on the side of the base substance 14 and a magnetic field generating portion 24 is positioned to face the disc D on the side of the protection layer 17.

The optical head 23 is operative to cause the recording light beam or the reading light beam, as which, for example, a laser light beam is used, to impinge upon the record track area 11 of the disc D for scanning the spiral guide groove 13 and contains an optical system for detecting the recording light beam or the reading light beam reflected by the disc D. Further, a head driving mechanism 25 which is composed of, for example, a linear motor mechanism is provided to be accompanied with the optical head 23 for moving the optical head 23 in the direction along the radius of the disc D, in other words, the direction transverse to each turn of the spiral record track formed on the record track area 11 of the disc D.

Figure 6:
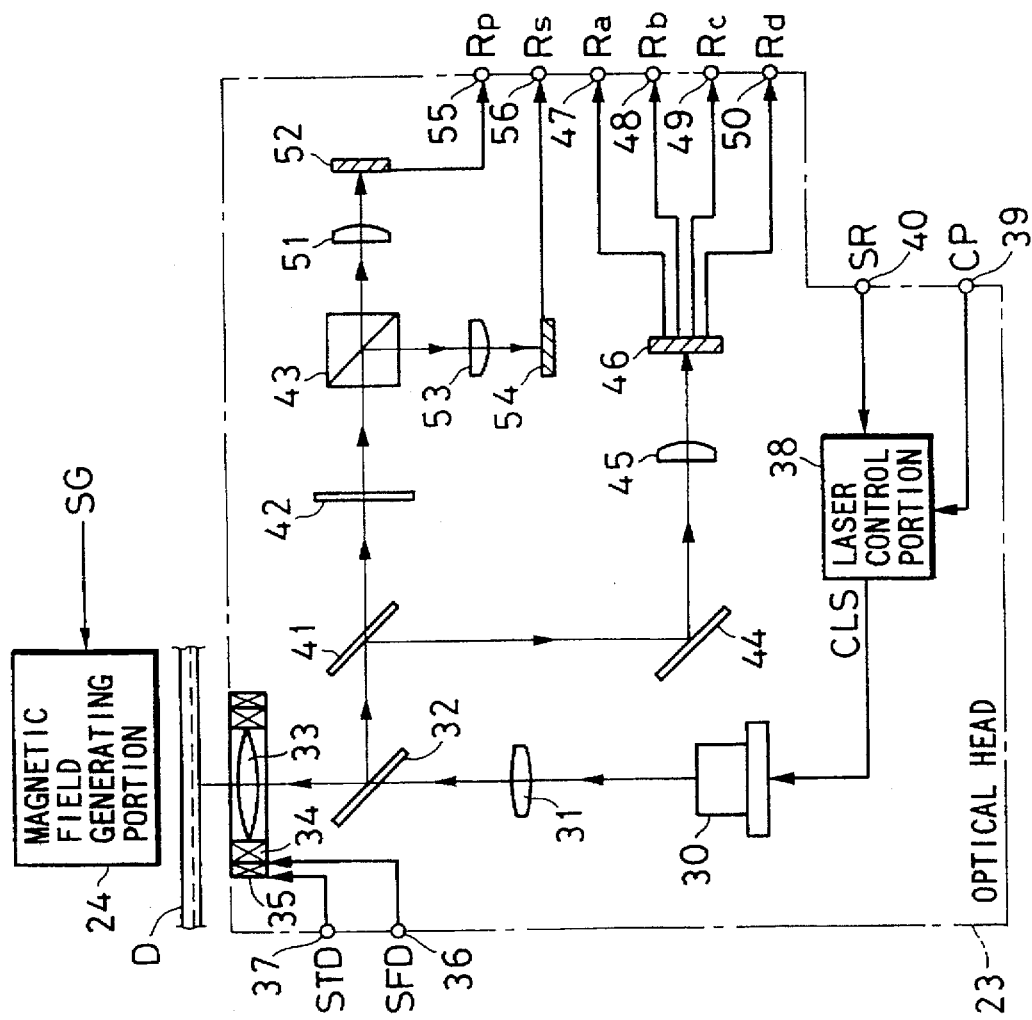
FIG. 6 is a schematic illustration showing one embodiment of an optical head use in the essential part of the information recording and reproducing apparatus shown in FIG. 1.

In the optical system contained in the optical head 23, as shown in FIG. 6, a laser light beam emitted from a laser light source 30 passes through a collimator lens 31 and a half mirror 32 to an objective lens 33 and is focused by the objective lens 33. The lase light beam focussed by the objective lens 33 impinges upon the disc D to scan the spiral guide groove 13 formed on the record track area 11 of the disc D.

The objective lens 33 is subjected to a positional control by a focus servo-control driving coil 34 to move for going away from or coming near the disc D and another positional control by a tracking servo-control driving coil 35 to cause the lase light beam impinging upon the disc D to move in the direction transverse to each turn of the spiral guide groove 13 provided on the disc D, so that the lase light beam impinging upon the disc D is properly focussed to forms a spot located properly on the spiral guide groove 13. A focus control signal SFD is supplied through a terminal 36 to the focus servo-control driving coil 34 and a tracking control signal STD is supplied through a terminal 37 to the tracking servo-control driving coil 35.

A laser control portion 38 is provided for the laser light source 30. A power control signal CP is supplied through a terminal 39 to the laser control portion 38 and a recording information signal SR is selectively supplied through a terminal 40 to the laser control portion 38. The laser control portion 38 is operative to generate a laser control signal CLS corresponding to the power control signal CP and selectively to the recording information signal SR and to supply the laser control signal CLS to the laser light source 30. As a result, the laser light beam emitted from the laser light source 30 is controlled in power in response to the power control signal CP and selectively intensity-modulated in response to the recording information signal SR.

When the optical head 23 performs an information signal recording operation, both of the power control signal CP and the recording information signal SR are supplied to the laser control portion 38 through the terminals 39 and 40, respectively, and when the optical head 23 performs an information signal reading operation, only the power control signal CP is supplied to the laser control portion 38 through the terminal 39.

The power control signal CP supplied to the laser control portion 38 through the terminal 39 acts on the laser light beam emitted from the laser light source 30 to cause the same to have an average light intensity larger than a relatively large predetermined value when the optical head 23 performs the information signal recording operation and to cause the laser light beam emitted from the laser light source 30 to have a relatively small constant light intensity when the optical head 23 performs the information signal reading operation. Accordingly, the laser light beam emitted from the laser light source 30 becomes a recording light beam having a relatively large average light intensity and intensity-modulated in response to the recording information signal SR when the optical head 23 performs the information signal recording operation and becomes a reading light beam having a relatively small constant light intensity when the optical head 23 performs the information signal reading operation.

Under a condition in which the optical head 23 performs the information signal recording operation, the recording light beam from the laser light source 30 is caused to impinge through the objective lens 33 upon the disc D on which a magnetic field generated by the magnetic field generating portion 24 acts as described later and therefore the information signal recording based on the recording information signal SR is carried out on the magnetic recording material layer 15 at the bottom of the spiral guide groove 13 formed on the record track area 11 of the disc D. As a result, the recording information signal SR is recorded on the magnetic recording material layer 15 at the bottom of the spiral guide groove 13. Simultaneously with this, the recording light beam having impinged upon the disc D is intensity-modulated at the disc D in response to both the tracking condition to the spiral guide groove 13 and the meanderings of the spiral guide groove 13 corresponding to the address data signal and then reflected by the disc D to return toward the objective lens 33. This means that the address data signal recorded substantially along the spiral guide groove 13 is read by the recording light beam.

The recording light beam thus reflected by the disc D to return therefrom passes through the objective lens 33 and enters into the half mirror 32 to be reflected thereby. A part of the recording light beam reflected by the half mirror 32 passes through a half mirror 41 and a halfwave plate 42 to a polarized beam splitter 43 and another part of the recording light beam reflected by the half mirror 32 is reflected by the half mirror 41 and then reflected further by a mirror 44 to enter through a cylindrical lens 45 to a photo-detecting portion 46. The photo-detecting portion 46 includes, for example, four photo-detectors, each of which is operative to receive the recording light beam having passed through the cylindrical lens 45 and to produce an electric signal varying in response to both the incident position on the photo-detector and the light intensity of the recording light beam received thereby. The electric signals produced by the photo-detectors included in the photo-detecting portion 46 are derived as detection output signals Ra, Rb, Rc and Rd to terminals 47, 48, 49 and 50, respectively.

Under a condition in which the optical head 23 performs the information signal reading operation, the reading light beam from the laser light source 30 is caused to impinge through the objective lens 33 upon the disc D. The reading light beam having impinged upon the disc D is intensity-modulated at the disc D in response to each of the tracking condition to the spiral guide groove 13, the meanderings of the spiral guide groove 13 corresponding to the address data signal and the condition of inversions in magnetization on the magnetic recording material layer 15 at the bottom of the spiral guide groove 13 formed on the record track area 11 of the disc D, in other words, the recording condition of the information signal on the magnetic recording material layer 15, and then reflected by the disc D to return toward the objective lens 33. This means that the address data signal recorded substantially along the spiral guide groove 13 and the information signal recorded on the magnetic recording material layer 15 at the bottom of the spiral guide groove 13 are read by the reading light beam.

The reading light beam thus reflected by the disc D to return therefrom passes through the objective lens 33 and enters into the half mirror 32 to be reflected thereby. A part of the recording light beam reflected by the half mirror 32 passes through the half mirror 41 and the halfwave plate 42 to the polarized beam splitter 43. The reading light beam entering into the polarized beam splitter 43 has first and second polarized plane components and the rotations of the polarized plane of the first polarized plane component brought about in response to each recorded portion of the magnetic recording material layer 15 is different from the rotations of the polarized plane of the second polarized plane component brought about in response to each recorded portion of the magnetic recording material layer 15. Therefore, the reading light beam entering into the polarized beam splitter 43 is separated into the first polarized plane component of the reading light beam and the second polarized plane component of the reading light beam by the polarized beam splitter 43. The first polarized plane component of the reading light beam obtained from the polarized beam splitter 43 is incident through a lens 51 upon a photo-detecting portion 52 and the second polarized plane component of the reading light beam obtained from the polarized beam splitter 43 is incident through a lens 53 upon a photo-detecting portion 54.

The photo-detecting portion 52 includes, for example, a single photo-detector which is operative to receive the first polarized plane component of the reading light beam having passed through the lens 51 and to produce a first electric signal corresponding to the first polarized plane component of the reading light beam. Similarly, the photo-detecting portion 54 includes, for example, a single photo-detector which is operative to receive the second polarized plane component of the reading light beam having passed through the lens 53 and to produce a second electric signal corresponding to the second polarized plane component of the reading light beam. The first electric signal produced by the photo-detector included in the photo-detecting portion 52 and the second electric signal produced by the photo-detector included in the photo-detecting portion 54 are derived as detection output signals Rp and Rs to terminals 55 and 56, respectively.

Another part of the reading light beam reflected by the half mirror 32 is reflected by the half mirror 41 and then reflected further by the mirror 44 to enter through the cylindrical lens 45 to the photo-detecting portion 46. Each of four photo-detectors included in the photo-detecting portion 46 is operative to receive the reading light beam having passed through the cylindrical lens 45 and to produce an electric signal varying in response to both the incident position on the photo-detector and the light intensity of the reading light beam received thereby. The electric signals produced by the photo-detectors included in the photo-detecting portion 46 are derived as detection output signals Ra, Rb, Rc and Rd to the terminals 47, 48, 49 and 50, respectively.

The optical head 23 is driven by the head driving mechanism 25 to move in the direction along the radius of the disc D when the disc D is rotated together with the disc driving table 21 and thereby the laser light beam incident upon the disc D through the objective lens 33 is caused to scan the spiral guide groove 13 on the disc D rotated.

Figure 7:
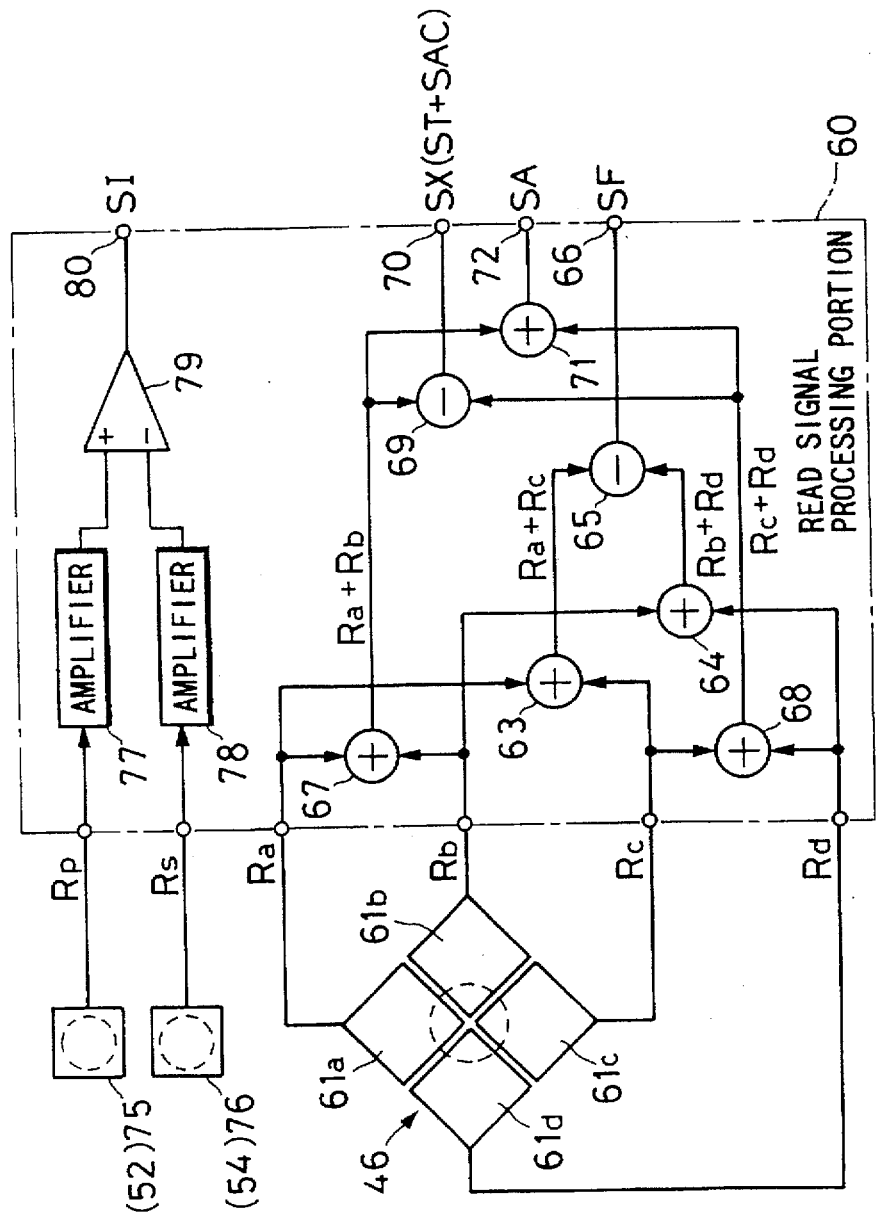
FIG. 7 is a schematic illustration showing a part of one embodiment of optical head and one embodiment of read signal processing portion use in the essential part of the information recording and reproducing apparatus shown in FIG. 1.

The detection output signals Ra, Rb, Rc and Rd derived from the photo-detecting portion 46, the detection output signal Rp derived from the photo-detecting portion 52 and the detection output signal Rs derived from the photo-detecting portion 54 are supplied to a read signal processing portion 60. In the read signal processing portion 60, as shown in FIG. 7, the detection output signals Ra and Rc obtained respectively from photo-detectors 61a and 61c which are two of four photo-detectors 61a, 61b, 61c and 61d included in the photo-detecting portion 46 are supplied to an adder circuit 63 to produce an added signal Ra+Rc. Similarly, the detection output signals Rb and Rd obtained respectively from photo-detectors 61b and 61d which are another two of four photo-detectors 61a, 61b, 61c and 61d are supplied to an adder circuit 64 to produce an added signal Rb+Rd. The added signals Ra+Rc and Rb+Rd are supplied to a subtractor circuit 65 and a difference signal (=Ra+Rc−Rb−Rd) which corresponding to a difference between the added signals Ra+Rc and the added signals Rb+Rd is obtained from the subtractor circuit 65 to be derived to a terminal 66 as a focus error signal SF which varies in response to a focus condition of the laser light beam incident upon the disc D at the bottom of the spiral guide groove 13 on the disc D.

The detection output signals Ra and Rb obtained respectively from photo-detectors 61a and 61b are supplied to an adder circuit 67 to produce an added signal Ra+Rb. Similarly, the detection output signals Rc and Rd obtained respectively from photo-detectors 61c and 61d are supplied to an adder circuit 68 to produce an added signal Rc+Rd. The added signals Ra+Rb and Rc+Rd are supplied to a subtractor circuit 69 and a difference signal (=Ra+Rb−Rc−Rd) which corresponds to a difference between the added signals Ra+Rb and the added signals Rc+Rd is obtained from the subtractor circuit 69 to be derived to a terminal 70 as an output signal SX containing a tracking error signal ST which represents a tracking condition of the laser light beam incident upon the disc D in relation to the spiral guide groove 13 on the disc D and a read output SAC of the address date signal recorded substantially along the spiral guide groove 13 on the disc D.

Since the carrier wave frequency of the address data signal recorded substantially along the spiral guide groove 13 is selected to reside in the frequency band higher than the servo-control frequency band of the tracking servo-control system as aforementioned, the read output SAC of the address date signal contained in the output signal SX derived from the subtractor circuit 69 resides in the frequency band higher than a frequency band of the tracking error signal ST contained also in the output signal SX.

The added signals Ra+Rb and Rc+Rd are further supplied to a adder circuit 71 to produce a total amount signal SA (=Ra+Rb+Rc+Rd) which corresponds to momentary total light amount of the laser light beam received by the photo-detectors 61a to 61d included in the photo-detecting portion 46. The total amount signal SA is derived to a terminal 72.

Further, the detection output signal Rp obtained from a photo-detector 75 included in the photo-detecting portion 52 and the detection output signal Rs obtained from a photo-detector 76 included in the photo-detecting portion 54 are supplied through amplifiers 77 and 78 respectively to a differential circuit 79 and a read output signal SI based on the information signal recorded on the magnetic recording material layer 15 at the bottom of the spiral guide groove 13 formed on the record track area 11 of the disc D is obtained from the differential circuit 79. The read output signal SI is derived to a terminal 80.

As for the focus error signal SF, the output signal SX containing the tracking error signal ST and the read output SAC of the address date signal, the total amount signal SA and the read output signal SI derived respectively to the terminals 66, 70, 72 and 80 of the read signal processing portion 60, as described above, the focus error signal SF, the output signal SX and the total amount signal SA are obtained when the optical head 23 performs the information signal recording operation, and the focus error signal SF, the output signal SX, the total amount signal SA and the read output signal SI are obtained when the optical head 23 performs the information signal reading operation.

In the embodiment shown in FIG. 1 having the optical head 23 and the read signal processing portion 60 as mentioned above, an operation control unit 81 is also provided. When the optical head 23 performs the information signal recording operation, information data DR which are to be recorded are supplied through a terminal 82 to an encoder portion 83, the power control signal CP for causing the laser light beam emitted from the laser light source 30 in the optical head 23 to have a relatively large light intensity is supplied to the optical head 23 from the operation control unit 81, and a control signal CE for controlling the encoder portion 83 to operate appropriately is supplied to the encoder portion 83 from the operation control unit 81.

In the encoder portion 83, the information data DR are coded to form coded information data in accordance with a predetermined coding system in response to the control signal CE and an information data signal SDR representing the coded information data based on the information data DR is produced in the form of, for example, a pulse train having high and low levels alternately, as shown in FIG. 8A. The information data signal SDR obtained from the encoder portion 83 is supplied to a recording signal generating portion 84. In the recording signal generating portion 84, the recording information signal SR having portions of high level VH and portions of low level VL in response to variations in level of the information data signal SDR, as shown in FIG. 8B, is produced. The low level VL of the recording information signal SR is selected to be not zero but a level higher slightly than zero. The recording information signal SR thus obtained from the recording signal generating portion 84 is supplied to the optical head 23 in order to intensity-modulate the laser light beam emitted from the laser light source 30 in the optical head 23.

In the optical head 23 to which the power control signal CP from the operation control unit 81 and the recording information signal SR from the recording signal generating portion 84 are supplied, the laser control signal CSL is produced in response to both the power control signal CP and the recording information signal SR in the laser control portion 38 to be supplied to the laser light source 30, as aforementioned, so that the laser light beam emitted from the laser light source 30 is controlled in light intensity by the power control signal CP and intensity-modulated by the recording information signal SR to produce the recording light beam. The recording light beam thus obtained has the relatively large light intensity larger than the predetermined value in response to the portions of high level VH of the recording information signal SR and the relatively small light intensity in response to the portions of low level VL of the recording information signal SR.

Further, under the condition in which the optical head 23 performs the information signal recording operation, a control signal CG is supplied to a magnetic field control portion 85 from the operation control unit 81. In the magnetic field control portion 85, a magnetic field control signal SG is produced in response to the control signal CG to be supplied to the magnetic field generating portion 24, and thereby the magnetic field generated in response to the magnetic field control signal SG by the magnetic field generating portion 24 acts on the disc D.

Under a condition in which the magnetic field from the magnetic field generating portion 24 acts on the disc D, the recording light beam intensity-modulated in response to the recording information signal SR is caused to impinge to the disc D from the optical head 23 and thereby the information signal recording is performed on the magnetic recording material layer 15 at the bottom of the spiral guide groove 13 formed on the record track area 11 of the disc D. In such information signal recording, the inversion in magnetization on the magnetic recording material layer 15 is brought about when the recording light beam has the relatively large light intensity in response to each portion of high level VH of the recording information signal SR so that the recording on the magnetic recording material layer 15 is carried out and any inversion in magnetization on the magnetic recording material layer 15 is not brought about when the recording light beam has the relatively small light intensity in response to each portion of low level VL of the recording information signal SR so that the recording on the magnetic recording material layer 15 is not carried out. Therefore, the information signal recording on the magnetic recording material layer 15 is intermittently performed.

When the recording light beam incident upon the disc D has the relatively large light intensity larger than the predetermined value, the reading of the address data signal recorded substantially along the spiral guide groove 13 is performed by the recording light beam, which is controlled to scan the spiral guide groove 13, simultaneously with the information signal recording on the magnetic recording material layer 15, and when the recording light beam incident upon the disc D has the relatively small light intensity, only the reading of the address data signal recorded substantially along the spiral guide groove 13 is performed by the recording light beam, which is controlled to scan the spiral guide groove 13, without the information signal recording on the magnetic recording material layer 15. Consequently, the focus error signal SF, the output signal SX and the total amount signal SA are obtained from the read signal processing portion 60 as aforementioned.

The focus error signal SF obtained from the read signal processing portion 60 is supplied to a servo-control portion 86. The output signal SX and the total amount signal SA obtained from the read signal processing portion 60 are supplied to an input terminal and a control terminal of a variable gain control portion 87, respectively.

The output signal SX obtained under the condition in which the optical head 23 performs the information signal recording operation is produced as the result of the scanning of the spiral guide groove 13 by the recording light beam which has the relatively large light intensity larger than the predetermined value and therefore composed of an address data signal component (SXC) on which the tracking condition of the recording light beam in relation to the spiral guide groove 13 is reflected and a recording information signal component (SR) superposed on the address data signal component (SXC), as shown in FIG. 8C. The total amount signal SA obtained under the condition in which the optical head 23 performs the information signal recording operation corresponds to the light intensity of the recording light beam intensity-modulated in response to the recording information signal SR and therefore has variations in level corresponding to variations in level of the recording information signal SR, as shown in FIG. 8D.

Figure 9:
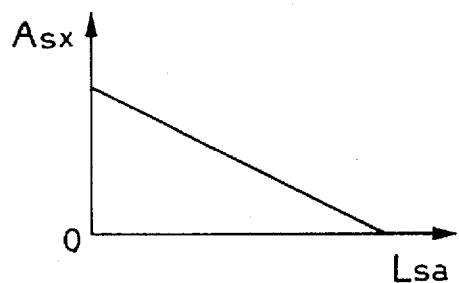
FIG. 9 is a characteristic chart used for explaining the operation of a variable gain control portion in the essential part of the information recording and reproducing apparatus shown in FIG. 1.

In the variable gain control portion 87, the output signal SX is subjected to a gain control in response to the total amount signal SA. The gain control characteristic in this gain control to the output signal SX is so determined that an amplitude Asx of the output signal SX is reduced in proportion to increase in a level Lsa of the total amount signal SA, as shown in FIG. 9. Accordingly, when the level Lsa of the total amount signal SA increases in response to the variations in level of the recording information signal SR, the amplitude Asx of the output signal SX which tends to increase in response to variations in level of the recording information signal component (SR) is reduced. Consequently, the recording information signal component (SR) contained in the output signal SX is substantially suppressed and the output signal SX which has been subjected to the gain control in response to the total amount signal SA is converted to correspond to the address data signal component (SXC) on which the tracking condition of the recording light beam in relation to the spiral guide groove 13 is reflected. That is, the recording information signal component (SR) which is contained as a spurious signal component in the output signal SX as the result of the reading of the address data signal recorded substantially along the spiral guide groove 13 performed by the recording light beam having variations in light intensity is substantially eliminated and the address data signal component (SXC) on which the tracking condition of the recording light beam in relation to the spiral guide groove 13 is appropriately obtained.

The output signal SX having been subjected to the gain control in response to the total amount signal SA in the variable gain control portion 87 is derived from the variable gain control portion 87 as an address data signal SXC on which the tracking condition of the recording light beam in relation to the spiral guide groove 13 is reflected. The address data signal SXC thus obtained from the variable gain control portion 87 corresponds to a signal formed by eliminating the recording information signal component (SR) from the output signal SX, as shown in FIG. 8E. Then, the address data signal SXC is supplied to a low pass filter (LPF) 88 for extracting from the address data signal SXC the tracking error signal ST representing a tracking condition of the recording light beam in relation to the spiral guide groove 13, a band pass filter (BPF) 89 for obtaining a carrier wave signal component SC of address data signal, and a BPF 90 for obtaining an address data signal SW.

The tracking error signal ST obtained from the LPF 88 and the carrier wave signal component SC of address data signal obtained from the BPF 89 are supplied to the servo-control portion 86. The address data signal SW obtained from the BPF 90, which is formed by frequency-modulating a predetermined carrier wave signal with a signal representing coded address data, is supplied to a demodulating portion 91.

An operation control signal CW from the operation control unit 81 is also supplied to the demodulating portion 91. In the demodulating portion 91, the address data signal SW is frequency-demodulated in response to the operation control signal CW and a signal SWD representing coded address data is produced to be supply to an address decoder portion 92.

In the address decoder portion 92, the signal SWD representing the coded address data is subjected to decoding process to reproduce address data DAD. The address data DAD obtained from the address decoder portion 92 are supplied to the operation control unit 81.

In the operation control unit 81 to which the address data DAD reproduced in the address decoder portion 92 are supplied, a head control signal CH for controlling the position of the optical head 23 in the direction along the radius of the disc D is produced to be supplied to the servo-control portion 86.

In the servo-control portion 86 to which the focus error signal SF from the read signal processing portion 60, the tracking error signal ST from the LPF 88, the carrier wave signal component SC of address data signal from the BPF 89 and the head control signal CH from the operation control unit 81 are supplied, the focus control signal SFD is produced based on the focus error signal SF, the tracking control signal STD is produced based on the tracking error signal ST, a motor driving signal SMD is produced based on the carrier wave signal component SC of address data signal, and a head driving signal SHD is produced based on the head control signal CH. The focus control signal SFD and the tracking control signal STD are supplied to the optical head 23, the motor driving signal SMD is supplied to the disc driving motor 22, the head driving signal SHD is applied to the head driving mechanism 25.

The motor driving signal SMD is used for suppressing variations in rotating speed of the disc driving motor 22 in response to variations in frequency of the carrier wave signal component SC of address data signal raised due to variations in rotating speed of the disc D. The head driving signal SHD is used for driving the head driving mechanism 25 to move the optical head 23 at a predetermined speed in the direction along the radius of the disc D.

On the other hand, when the optical head 23 performs the information signal reading operation, the information data DR are not supplied through the terminal 82 to the encoder portion 83 and therefore the recording information signal SR is not supplied to the optical head 23 from the recording signal generating portion 84. Further, the control signal CG is not supplied to the magnetic field control portion 85 from the operation control unit 81 and therefore the magnetic field generating portion 24 does not produce any magnetic field. The power control signal CP supplied to the optical head 23 from the operation control unit 81 is formed for causing the laser light source 30 in the optical head 23 to emit the lase light beam having the relatively small constant light intensity.

Under such a condition, the lase light beam emitted from the laser light source 30 with the relatively small constant light intensity is caused to impinge upon the record track area 11 of the disc D as the reading light beam so that the information signal reading from the magnetic recording material layer 15 at the bottom of the spiral guide groove 13 is performed by the reading light beam which is controlled to scan the spiral guide groove 13 and simultaneously the address data signal recorded substantially along the spiral guide groove 13 is read by the reading light beam which is controlled to scan the spiral guide groove 13. As a result, the read output signal SI, the focus error signal SF, the output signal SX and the total amount signal SA are obtained from the read signal processing portion 60 in the same manner as aforementioned.

The read output signal SI obtained from the read signal processing portion 60 is supplied to a decoder portion 93. An operation control signal CD from the operation control unit 81 is also supplied to the decoder portion 93. In the decoder portion 93, the read output signal SI is subjected to decoding process in response to the operation control signal CD and a reproduced information signal SID is obtained. The reproduced information signal SID from the decoder portion 93 is supplied to an information signal processing portion 94 to be subjected to various kinds of processes therein and an output information signal SOI produced based on the reproduced information signal SID is derived from the information signal processing portion 94 to a terminal 95.

The focus error signal SF, the output signal SX and the total amount signal SA obtained from the read signal processing portion 60 are processed in almost the same manner as those in the case where the optical head 23 performs the information signal recording operation. However, in the condition in which the optical head 23 performs the information signal reading operation, since the information signal reading from the magnetic recording material layer 15 at the bottom of the spiral guide groove 13 and the reading of the address data signal recorded substantially along the spiral guide groove 13 are performed by the reading light beam having the relatively small constant light intensity, the output signal SX contains only the address data signal component (SXC) on which the tracking condition of the recording light beam in relation to the spiral guide groove 13 and the total amount signal SA has a substantially constant level. Consequently, the address data signal SXC having variations in amplitude similar to those of the output signal SX is obtained from the variable gain control portion 87 to which the output signal SX is supplied.

The condition in which the optical head 23 performs the information signal recording operation and the condition in which the optical head 23 performs the information signal reading operation as mentioned above are selectively set in accordance with a control signal CC which is produced in response to manipulations on control buttons or the like provided in a manual control block 96 to be supplied to the operation control unit 81.

Figure 10:
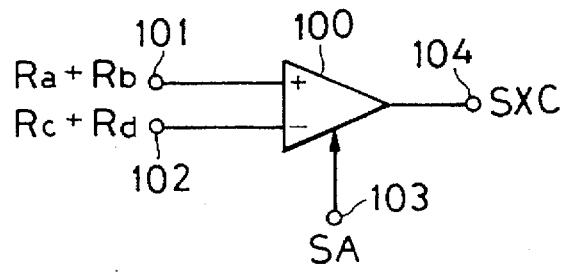
FIG. 10 is a schematic circuit diagram showing one embodiment including a part of a read signal processing portion and a variable gain control portion in the essential part of the information recording and reproducing apparatus shown in FIG. 1.

A circuit portion which includes the subtractor circuit 69 partially constituting the read signal processing portion 60 for producing the output signal SX and the variable gain control portion 87 to which the output signal SX from the subtractor circuit 69 is supplied can be formed with a circuit structure including a variable gain differential circuit 100, as shown in FIG. 10.

In the circuit structure shown in FIG. 10, the added signal Ra Rb obtained from the adder circuit 67 and the added signal Rc+Rd obtained from the adder circuit 68 are supplied to a pair of input terminals 101 and 102 of the variable gain differential circuit 100, respectively, and the total amount signal SA obtained from the adder circuit 71 is supplied to a control terminal 103 of the variable gain differential circuit 100. In the variable gain differential circuit 100, an operation for obtaining the difference between the added signals Ra+Rb and Rc+Rd is performed in response to the total amount signal SA in such a manner that the gain therein is reduced in proportion to increase in the level of the total amount signal SA. As a result, an address data signal SXC corresponding to the address data signal SXC obtained from the variable gain control portion 87 is obtained at an output terminal 104 of the variable gain differential circuit 100.

Figure 11:
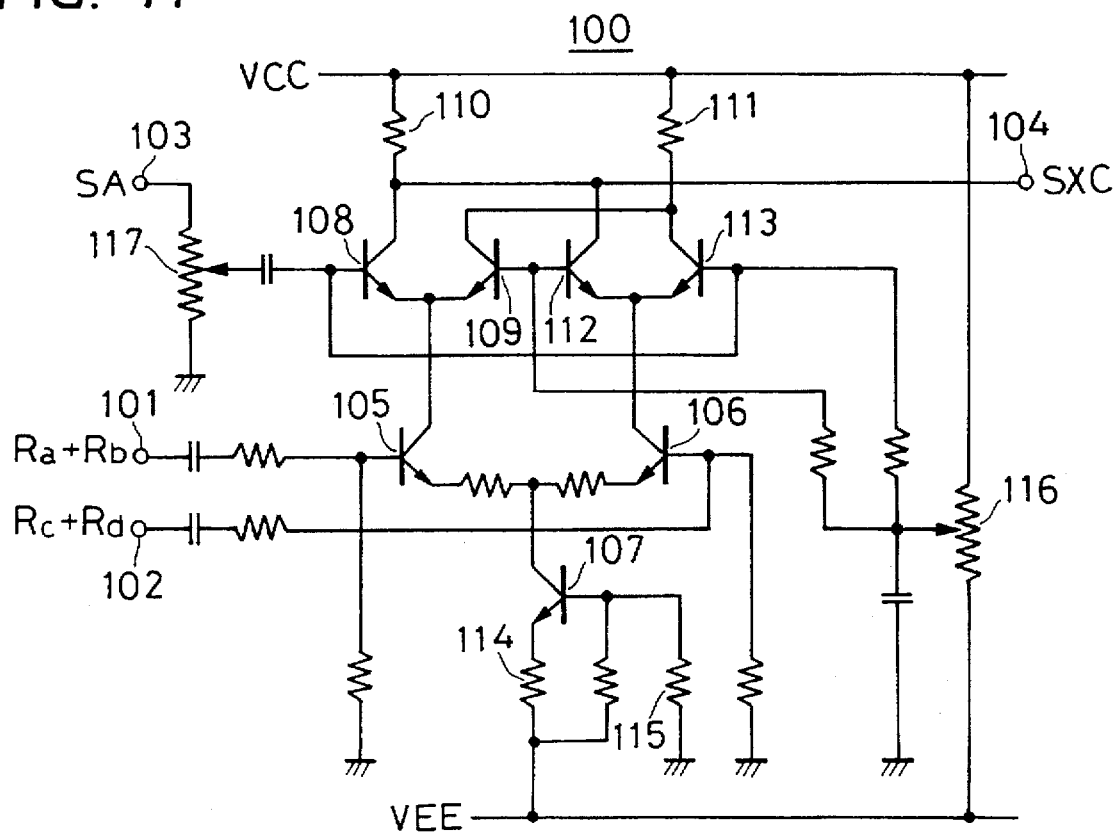
FIG. 11 is a circuit diagram showing a differential variable gain controlling circuit in the embodiment shown in FIG. 10.

FIG. 11 shows an embodiment of variable gain differential circuit 100 which is shown in FIG. 10. In the embodiment shown in FIG. 11, the added signals Ra+Rb from the input terminal 101 and the added signals Rc+Rd from the input terminal 102 are supplied to a base of a transistor 105 and a base of a transistor 106, respectively. The transistors 105 and 106 constitute, together with a transistor 107, a differential amplifier. The transistor 105 has its collector connected to a positive power supply voltage source VCC through a differential circuit portion composed of transistors 108 and 109 and resistors 110 and 111. Similarly, the transistor 106 has its collector connected to the positive power supply voltage source VCC through a differential circuit portion composed of transistors 112 and 113 and the resistors 110 and 111. The transistor 107 has its collector connected to both emitters of the transistors 105 and 106, its emitter connected through a resistor 114 to a negative power supply voltage source VEE, and its base connected through a resistor 115 to ground.

A bias voltage obtained at a voltage dividing resistor 116 connected between the positive power supply voltage source VCC and ground is supplied to bases of the transistors 108, 109, 112 and 113. The total amount signal SA from the control terminal 103 is supplied through a voltage dividing resistor 117 to the bases of the transistors 108 and 113. Then, the address data signal SXC is obtained at the output terminal 104 provided at a connecting point between each of collectors of the transistors 108 and 112 and the resistor 110.

The embodiment of variable gain differential circuit 100 shown in FIG. 11 is relatively simple in construction and suitable for being designed in the form of integrated circuit.

Although the disc D applied to the embodiment of information recording and reproducing apparatus according to the present invention as described above is provided thereon with the spiral guide groove 13 along which the address data signal is substantially recorded and the address data signal SW is obtained from the BPF 90 employed in the embodiment of information recording and reproducing apparatus, a disc applicable to the information recording and reproducing apparatus according to the present invention is able to be provided thereon with a spiral guide groove along which one or more control signals which are not limited to the address data signal are substantially recorded.

What is claimed is:

1. An information recording and reproducing apparatus comprising:

optical means for causing a light beam to impinge upon a disc-shaped record medium, on which a spiral guide groove surrounding a central portion of the disc-shaped record medium is formed to have side-wall portions opposite to each other and meandering in response to a predetermined control signal so that the predetermined control signal is substantially recorded along the spiral guide groove, for scanning the spiral guide groove continuously;

light beam modulating means operative to intensity-modulate the light beam incident upon the disc-shaped record medium for scanning the spiral guide groove in response to an information signal so that the information signal is intermittently recorded on the disc-shaped record medium and operative further to cause the light beam to keep a relatively small intensity during a period in which the recording of the information signal is temporarily interrupted;

photo-detecting means for detecting the light beam coming from the disc-shaped record medium on which the spiral guide groove is scanned by the light beam;

read signal processing means operative to obtain a read output signal containing a read output of the predetermined control signal recorded along the spiral guide groove and a total amount signal corresponding to momentary total light amount of the light beam coming from the disc-shaped record medium to be received by said photo-detecting means on the strength of a detection output signal obtained from said photo-detecting means;

variable gain control means operative to perform a gain-control to the read output signal obtained from said read signal processing means in response to the total amount signal obtained from said read signal processing means when the light beam coming from the disc-shaped record medium is detected by said photo-detecting means, in which the gain control performed by said variable gain control means provides a gain control characteristic to said read output signal such that an amplitude of said read output signal is reduced in proportion to an increase in a level of said total amount signal so that when the level of the total amount signal increases in response to variations in a level of the information signal the amplitude of said read output signal is reduced; and signal reproducing means for obtaining a reproduced output of the predetermined control signal recorded along the spiral guide groove on the strength of the read output signal having been subjected to the gain-control performed by said variable gain control means.

2. An information recording and reproducing apparatus according to claim 1, wherein the information signal is intermittently recorded at a bottom portion of the spiral guide groove formed on the disc-shaped record medium by means of the light beam intensity-modulated by said light beam modulating means.

3. An information recording and reproducing apparatus according to claim 1, wherein said optical means is operative to cause the light beam to impinge upon the disc-shaped record medium having the spiral guide groove, along which an address data signal representing addresses on a record track area of the disc-shaped record medium, and said signal reproducing means is operative to obtain a reproduced output of the address data signal recorded along the spiral guide groove on the strength of the read output signal having been subjected to the gain-control performed by said variable gain control means.

4. An information recording and reproducing apparatus according to claim 4 further comprising operation control means operative to control a position of said optical means in relation to the disc-shaped record medium in response to the reproduced output of the address data signal obtained from said signal reproducing means.

5. An information recording and reproducing apparatus comprising:

optical means for causing a light beam to impinge upon a disc-shaped record medium, on which a spiral guide groove surrounding a central portion of the disc-shaped record medium is formed to have side-wall portions opposite to each other and meandering in response to a predetermined control signal so that the predetermined control signal is substantially recorded along the spiral guide groove, for scanning the spiral guide groove continuously;

light beam modulating means operative to intensity-modulate the light beam incident upon the disc-shaped record medium for scanning the spiral guide groove in response to an information signal so that the information signal is intermittently recorded on the disc-shaped record medium and operative further to cause the light beam to keep a relatively small intensity during a period in which the recording of the information signal is temporarily interrupted;

photo-detecting means for detecting the light beam coming from the disc-shaped record medium on which the spiral guide groove is scanned by the light beam;

read signal processing means operative to obtain a read output signal containing a read output of the predetermined control signal recorded along the spiral guide groove and a total amount signal corresponding to momentary total light amount of the light beam coming from the disc-shaped record medium to be received by said photo-detecting means on the strength of a detection output signal obtained from said photo-detecting means;

variable gain control means operative to perform a gain-control to the read output signal obtained from said read signal processing means in response to the total amount signal obtained from said read signal processing means when the light beam coming from the disc-shaped record medium is detected by said photo-detecting means, in which said variable gain control means is operative to control a gain for the read output signal obtained from said read signal processing means so as to be reduced in proportion to an increase in level of the total amount signal obtained from said read signal processing means; and signal reproducing means for obtaining a reproduced output of the predetermined control signal recorded along the spiral guide groove on the strength of the read output signal having been subjected to the gain-control performed by said variable gain control means.

* * * * *